United States Patent
Lee et al.

(10) Patent No.: US 10,516,986 B2
(45) Date of Patent: Dec. 24, 2019

(54) METHOD FOR DISCOVERING RELAY UE VIA D2D LINK AT UE IN WIRELESS COMMUNICATION SYSTEM AND APPARATUS THEREFOR

(71) Applicant: LG ELECTRONICS INC., Seoul (KR)

(72) Inventors: Jaewook Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 8 days.

(21) Appl. No.: 15/749,085

(22) PCT Filed: Aug. 10, 2016

(86) PCT No.: PCT/KR2016/008787
§ 371 (c)(1),
(2) Date: Jan. 30, 2018

(87) PCT Pub. No.: WO2017/026791
PCT Pub. Date: Feb. 16, 2017

(65) Prior Publication Data
US 2018/0227736 A1    Aug. 9, 2018

Related U.S. Application Data

(60) Provisional application No. 62/203,928, filed on Aug. 12, 2015.

(51) Int. Cl.
*H04W 8/00* (2009.01)
*H04W 76/10* (2018.01)
(Continued)

(52) U.S. Cl.
CPC ............. *H04W 8/005* (2013.01); *H04W 4/70* (2018.02); *H04W 36/03* (2018.08); *H04W 36/08* (2013.01);
(Continued)

(58) Field of Classification Search
CPC ... H04W 8/005; H04W 36/03; H04W 56/001; H04W 36/08; H04W 76/11; H04W 4/70;
(Continued)

(56) References Cited

U.S. PATENT DOCUMENTS

2005/0232212 A1* 10/2005 Kang ................ H04W 36/0061
370/338
2016/0212682 A1* 7/2016 Chung .................. H04W 76/14
(Continued)

FOREIGN PATENT DOCUMENTS

EP         2833694        2/2015
WO      2015095580        6/2015

OTHER PUBLICATIONS

PCT International Application No. PCT/KR2016/008787, Notification of Transmittal of the International Search Report and the Written Opinion of the International Searching Authority, or Declaration dated Nov. 21, 2016, 11 pages.
(Continued)

*Primary Examiner* — Steven H Nguyen
(74) *Attorney, Agent, or Firm* — Lee Hong Degerman Kang Waimey

(57) ABSTRACT

A method for communicating a relay user equipment (UE) for a device to device (D2D) link at a UE in a wireless communication system is disclosed. The method includes steps of receiving, from the relay UE, information on an identifier of a second cell connected with the relay UE; transmitting, to a first cell connected with the UE, an assistance message including information that an identifier
(Continued)

of the first cell is different from the identifier of the second cell; receiving, from the first cell, a resource allocation message including resource information for a communication via the relay UE; and performing the communication via the relay UE based on the resource information.

15 Claims, 7 Drawing Sheets

(51) Int. Cl.

| | | |
|---|---|---|
| *H04W 88/02* | (2009.01) | |
| *H04W 88/04* | (2009.01) | |
| *H04W 4/70* | (2018.01) | |
| *H04W 76/11* | (2018.01) | |
| *H04W 36/08* | (2009.01) | |
| *H04W 56/00* | (2009.01) | |
| *H04W 36/00* | (2009.01) | |
| *H04B 7/155* | (2006.01) | |

(52) U.S. Cl.
CPC ......... *H04W 56/001* (2013.01); *H04W 76/10* (2018.02); *H04W 76/11* (2018.02); *H04W 88/02* (2013.01); *H04W 88/04* (2013.01); *H04B 7/15507* (2013.01)

(58) Field of Classification Search
CPC ..... H04W 76/10; H04W 88/04; H04W 88/02; H04B 7/15507
See application file for complete search history.

(56) References Cited

U.S. PATENT DOCUMENTS

| | | | |
|---|---|---|---|
| 2016/0323868 A1* | 11/2016 | Kalhan | H04W 72/1278 |
| 2016/0330781 A1* | 11/2016 | Kalhan | H04W 72/1278 |
| 2017/0111273 A1* | 4/2017 | Kuge | H04L 69/22 |
| 2018/0092022 A1* | 3/2018 | Huang | H04W 36/08 |
| 2018/0109985 A1* | 4/2018 | Huang | H04W 76/23 |
| 2018/0160287 A1* | 6/2018 | Wu | H04W 4/06 |
| 2018/0167986 A1* | 6/2018 | Lin | H04W 72/048 |

OTHER PUBLICATIONS

Huawei, et al., "Discussion on resource assignment to support UE-to-Network relay", 3GPP TSG RAN WG1 Meeting #81, R1-152467, May 2015, 4 pages.

Catt, "Overviews on UE-to-Network Relay procedure and Relay UE", 3GPP TSG RAN WG1 Meeting #81, R1-152572, May 2015, 4 pages.

Intel, "D2D Discovery Support in the Presence of Multiple Carriers and PLMNs", 3GPP TSG RAN WG1 Meeting #81, R1-152629, May 2015, 5 pages.

* cited by examiner

[Fig. 1]
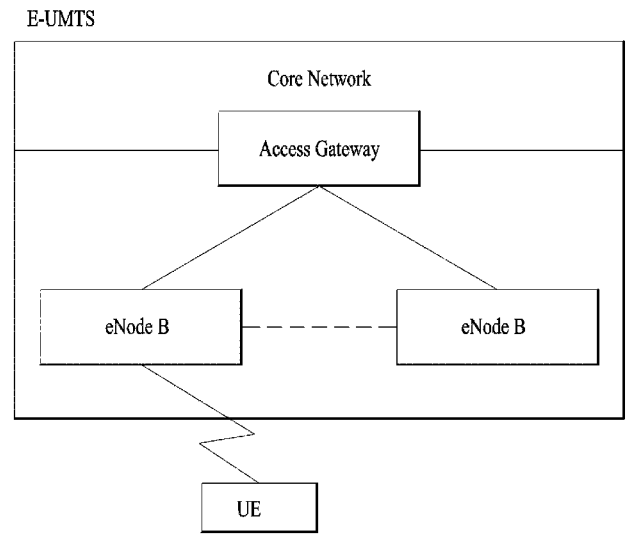
[Fig. 2]
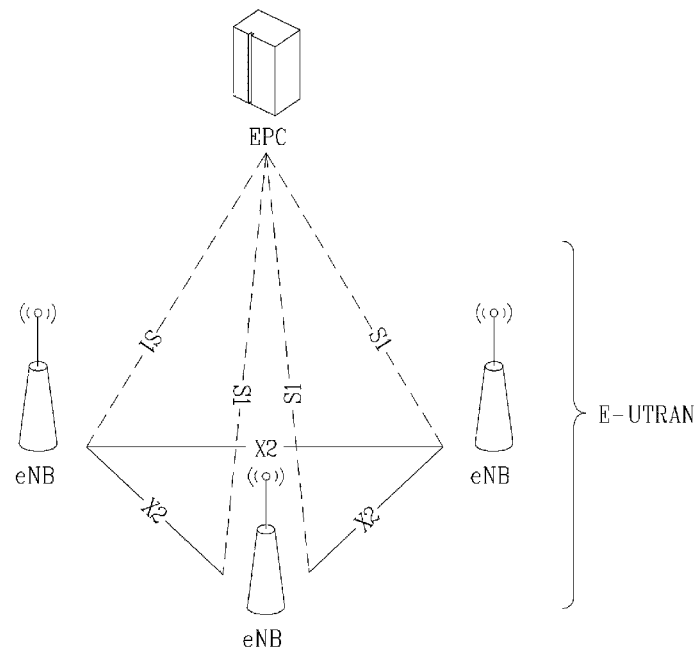

[Fig. 3]
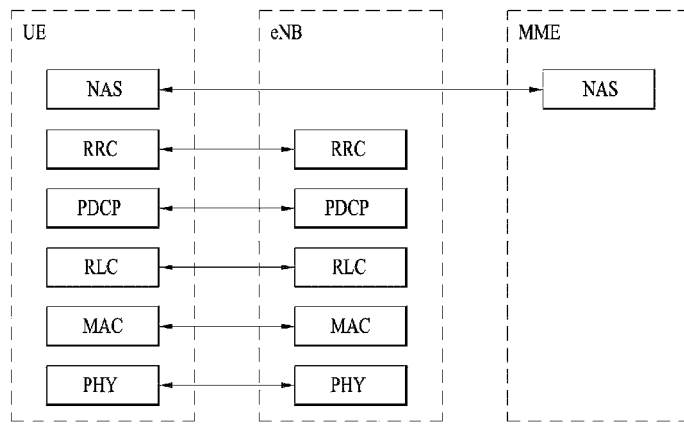
(A) Control-plane protocol stack
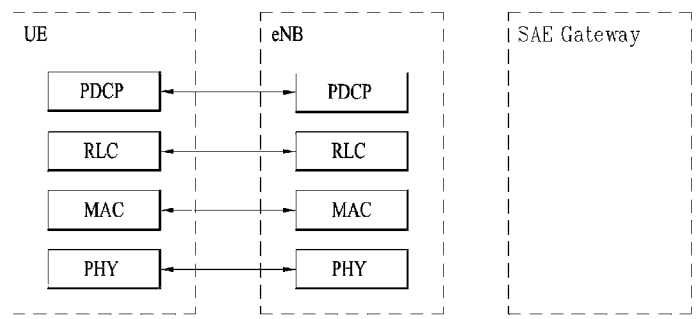
(B) User-plane protocol stack
[Fig. 4]
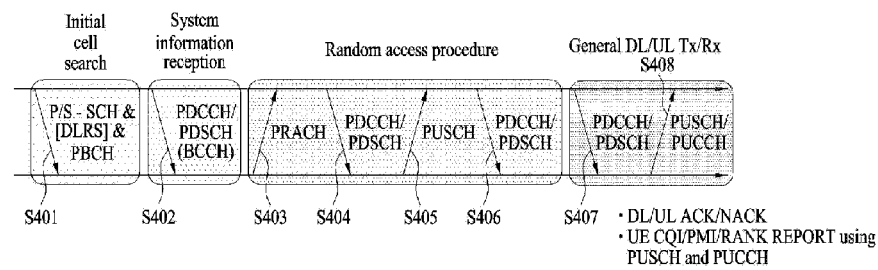
[Fig. 5]
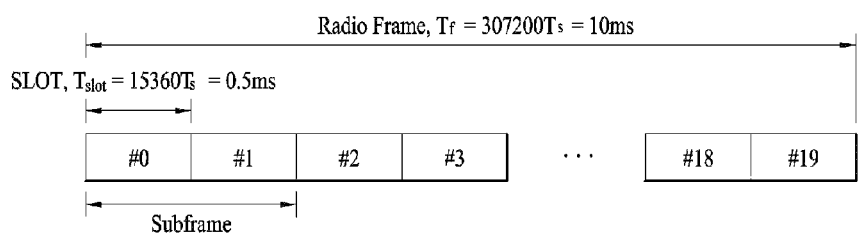

[Fig. 6]
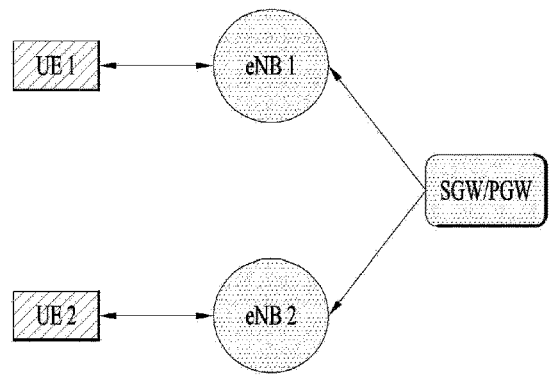
[Fig. 7]
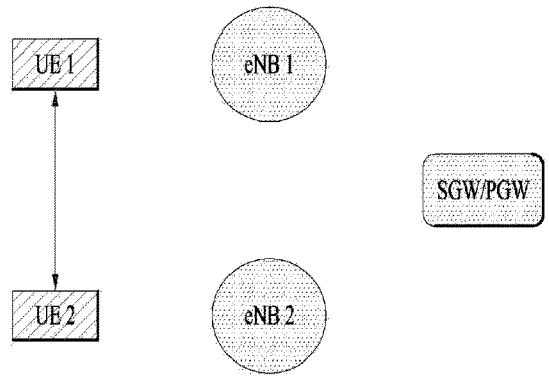
[Fig. 8]
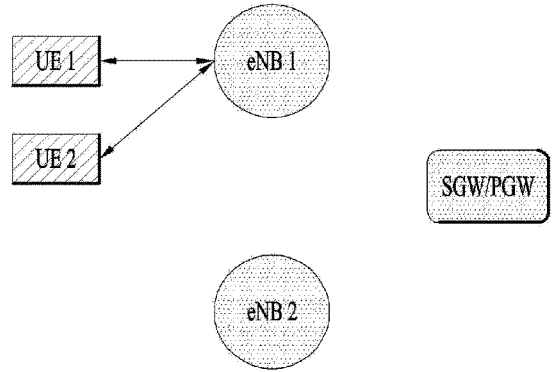
[Fig. 9]
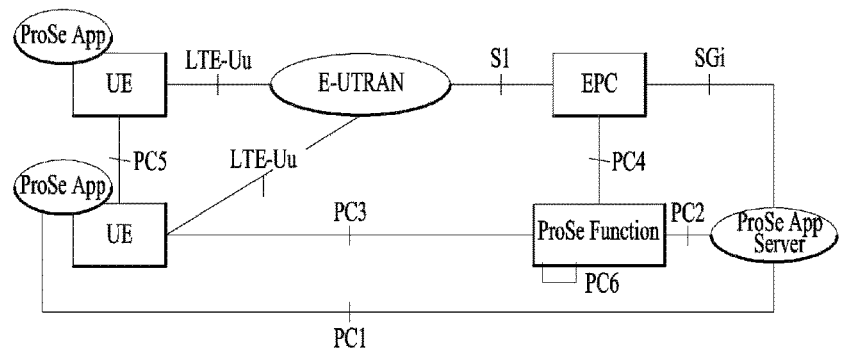

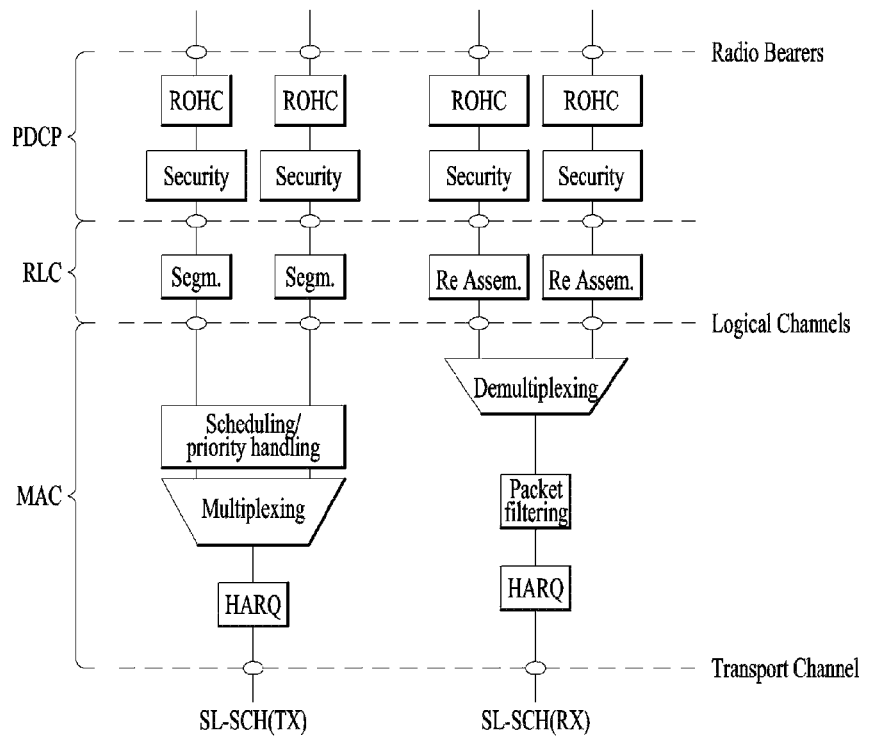
[Fig. 10]

[Fig. 11]
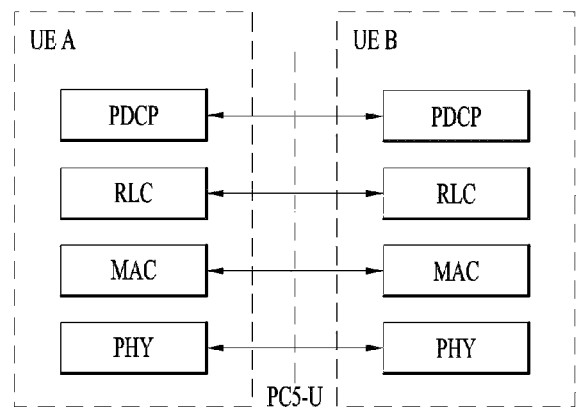
(a)
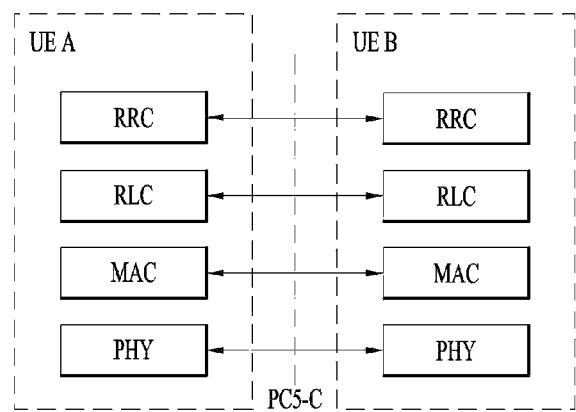
(b)
[Fig. 12]
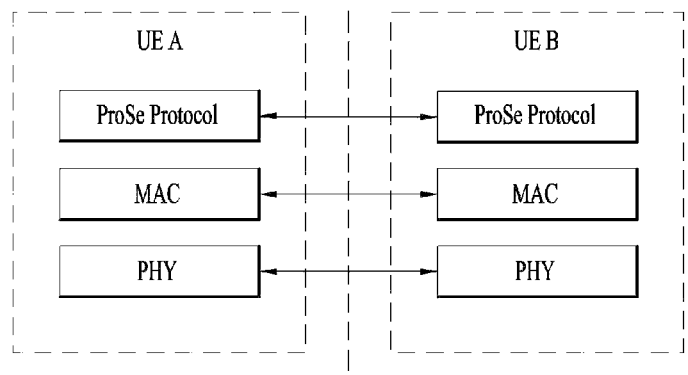

[Fig. 13]
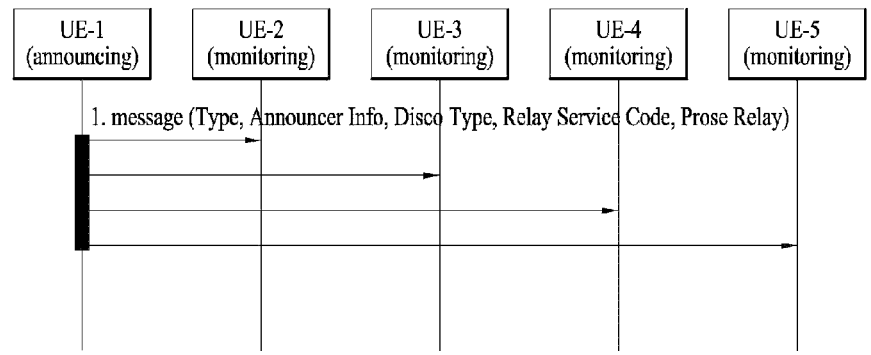
[Fig. 14]
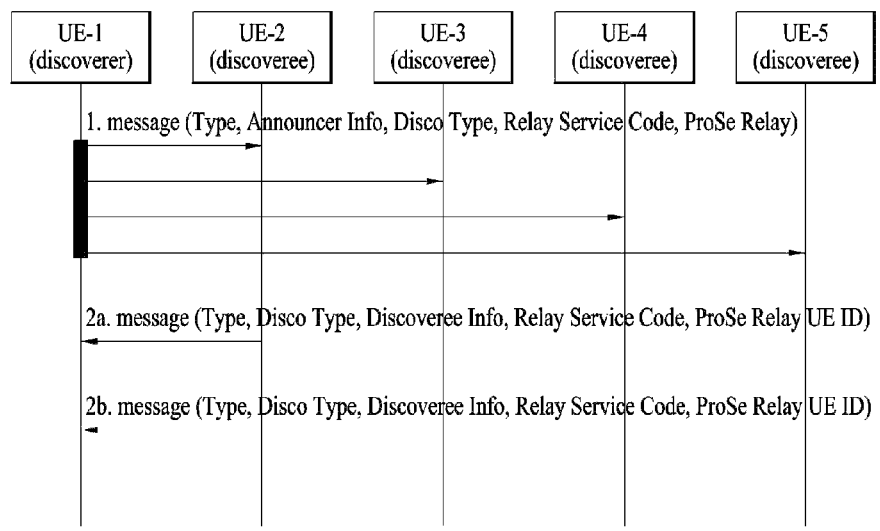
[Fig. 15]
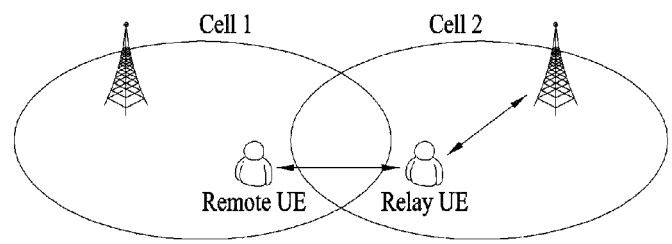

[Fig. 16]
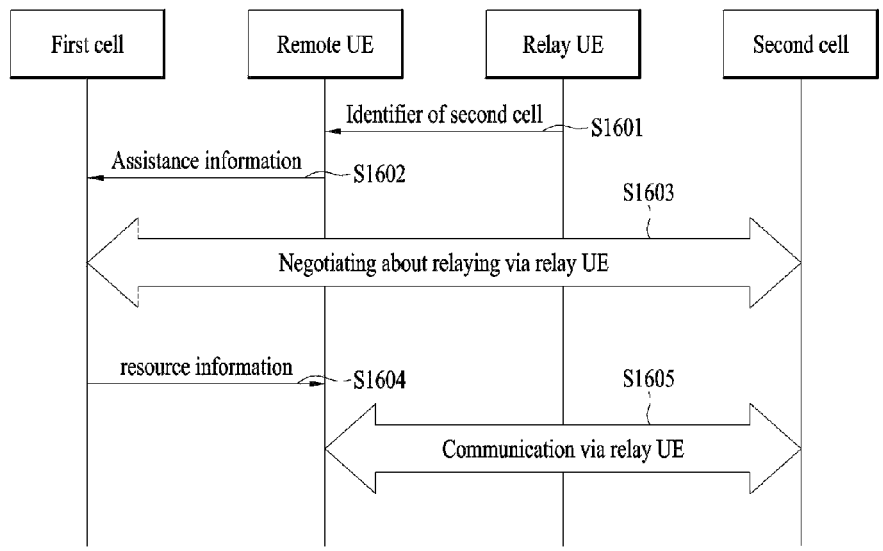
[Fig. 17]
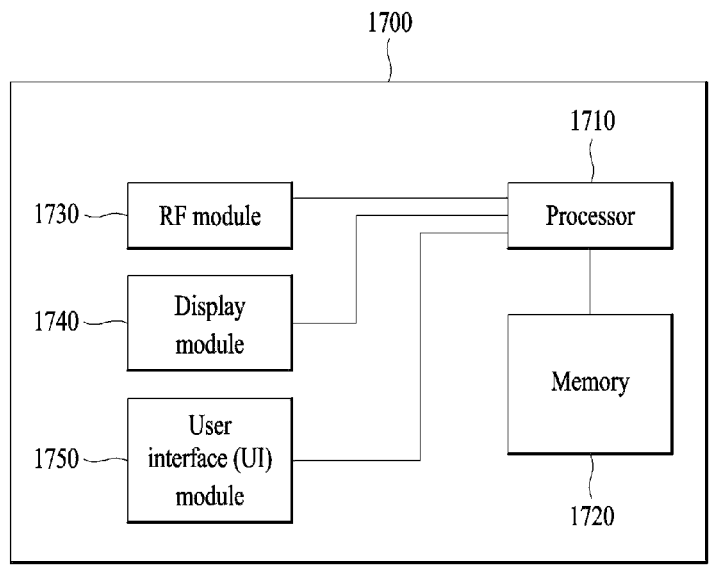

METHOD FOR DISCOVERING RELAY UE VIA D2D LINK AT UE IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2016/008787, filed on Aug. 10, 2016, which claims the benefit of U.S. Provisional Application No. 62/203,928, filed on Aug. 12, 2015, the contents of which are all hereby incorporated by reference herein in their entirety.

TECHNICAL FIELD

The present invention relates to a wireless communication system and, more particularly, to a method for discovering a relay user equipment (UE) via a device to device (D2D) link at a user equipment (UE) in a wireless communication system and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNB transmits uplink scheduling information with respect to uplink data to a corresponding UE to inform the UE of an available time/frequency domain, coding, data size, and HARQ-related information. An interface may be used to transmit user traffic or control traffic between eNBs. A Core Network (CN) may include the AG, a network node for user registration of the UE, and the like. The AG manages mobility of a UE on a Tracking Area (TA) basis, each TA including a plurality of cells.

Although radio communication technology has been developed up to LTE based on Wideband Code Division Multiple Access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simple structure, open interface, and suitable power consumption by a UE are required.

DISCLOSURE OF INVENTION

Technical Problem

Based on the above discussion, the present invention proposes a method for discovering a relay user equipment (UE) via a device to device (D2D) link at a user equipment (UE) in a wireless communication system and an apparatus therefor.

Solution to Problem

In accordance with an embodiment of the present invention, a method for communicating via a relay user equipment (UE) for a device to device (D2D) link at a UE in a wireless communication system is disclosed. Especially, the method includes steps of receiving, from the relay UE, information on an identifier of a second cell connected with the relay UE; transmitting, to a first cell connected with the UE, an assistance message including information that an identifier of the first cell is different from the identifier of the second cell; receiving, from the first cell, a resource allocation message including resource information for a communication via the relay UE; and performing the communication via the relay UE based on the resource information.

Further, in accordance with another embodiment of the present invention, a user equipment (UE) in a wireless communication system is disclosed. Especially, the UE includes a radio frequency (RF) unit; and a processor configured to process signals, wherein the processor receives, from a relay UE, information on an identifier of a second cell connected with the relay UE, transmits, to a first cell connected with the UE, an assistance message including information that an identifier of the first cell is different from the identifier of the second cell, receives, from the first cell, a resource allocation message including resource information for a communication via the relay UE, and performs the communication via the relay UE based on the resource information.

Preferably, the first cell transmits a relay request message including the assistance message to the second cell and receives the resource information from the second cell in response to the relay request message.

Preferably, the information on the identifier of the second cell is included in a discovery message announced from the relay UE.

Preferably, the information on the identifier of the second cell is transmitted from the relay UE, when the second cell connected with the relay UE is changed or when the first cell connected with the UE is changed. In this case, information on the identifier of the first cell is transmitted to the relay UE when the first cell connected with the UE is changed.

Furthermore, the identifier of the first cell and the identifier of the second cell comprise at least one of operating frequency, PCI (Physical Cell ID) or ECGI (E-UTAN Cell Global Identifier).

More preferably, it should be determined whether the identifier of the first cell is different from the identifier of the second cell or not. In this case, the assistance message is transmitted when the identifier of the first cell is different from the identifier of the second cell.

It is to be understood that both the foregoing general description and the following detailed description of the present invention are exemplary and explanatory and are intended to provide further explanation of the invention as claimed.

Advantageous Effects of Invention

According to embodiments of the present invention, the UE can discover inter-cell relay UE via the D2D link efficiently in the wireless communication system.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIG. 1 is a diagram showing a network structure of an Evolved Universal Mobile Telecommunications System (E-UMTS) as an example of a wireless communication system.

FIG. 2 is a diagram showing the concept of a network structure of an Evolved Universal Terrestrial Radio Access Network (E-UTRAN).

FIG. 3 is a diagram showing a control plane and a user plane of a radio interface protocol between a User Equipment (UE) and an Evolved Universal Terrestrial Radio Access Network (E-UTRAN) based on a 3rd Generation Partnership Project (3GPP) radio access network standard.

FIG. 4 is a diagram showing physical channels used in a 3GPP system and a general signal transmission method using the same.

FIG. 5 is a diagram showing the structure of a radio frame used in a Long Term Evolution (LTE) system.

FIG. 6 is an example of default data path for a normal communication;

FIGS. 7 and 8 are examples of data path scenarios for a proximity communication;

FIG. 9 is a conceptual diagram illustrating for a non-roaming reference architecture;

FIG. 10 is a conceptual diagram illustrating for a Layer 2 Structure for Sidelink;

FIG. 11 is a conceptual diagram illustrating for protocol stack for ProSe Direct Communication;

FIG. 12 is a conceptual diagram illustrating for a PC5 interface for ProSe Direct Discovery;

FIG. 13 is a diagram illustrating the procedure for Relay Discovery Model A;

FIG. 14 is a diagram illustrating the procedure for Relay Discovery Model B;

FIG. 15 is a conceptual diagram illustrating a case that two UEs are staying in different cells;

FIG. 16 is a flow chart illustrating the procedure for selecting the relay UE by the remote UE in accordance with one embodiment of the present invention;

FIG. 17 is a block diagram of a communication apparatus according to an embodiment of the present invention.

BEST MODE FOR CARRYING OUT THE INVENTION

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2 is a diagram showing the concept of a network structure of an Evolved Universal Terrestrial Radio Access Network (E-UTRAN). In particular, the E-UTRAN system is a system evolved from the existing UTRAN system. The E-UTRAN includes cells (eNBs) and cells are connected via an X2 interface. A cell is connected to a user equipment (UE) via an air interface and is connected to an evolved packet core (EPC) via an S1 interface.

The EPC includes a mobility management entity (MME), a serving-gateway (S-GW) and a packet data network-gateway (PDN-GW). The MME has access information of a UE and information about capabilities of the UE. Such information is mainly used for mobility management of the UE. The S-GW is a gateway having an E-UTRAN as an end point and the PDN-GW is a gateway having a PDN as an end point.

FIG. 3 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A medium access control (MAC) layer, a radio link control (RLC) layer and a packet data convergence protocol (PDCP) layer may be located in a second layer. The MAC layer of the second layer serves to map various logical channels to various transport channels. The MAC layer performs a logical channel multiplexing function for mapping several logical channels to one transport channel. The MAC layer is connected to a Radio Link Control (RLC) layer, which is a higher layer, via a logical channel, and the logical channel may be roughly divided into a control channel for transmitting information about the control plane and a traffic channel for transmitting information about the user plane, according to the type of transmitted information.

The RLC layer of the second layer segments and concatenates data received from a higher layer, thereby controlling a data size suitable for enabling a lower layer to transmit data in a radio interval. The RLC layer provides three modes, namely, a transparent mode (TM), an unacknowledged mode (UM) and an acknowledged mode (AM) to support a variety of QoS requested by each radio bearer (RB). Especially, for reliable data transmission, the AM RLC performs a function to retransmit data through automatic repeat request (ARQ).

The packet data convergence protocol (PDCP) layer of the second layer performs a header compression function for reducing the size of an IP packet header which is relatively great in size and includes unnecessary control information in order to efficiently transmit IP packets, such as IPv4 or IPv6 packets, in a radio interval with a relatively narrow bandwidth. Accordingly, only necessary information need be included in the header part of data for transmission, so as to increase transmission efficiency of a radio interval. In the LTE system, the PDCP layer also performs a security function. The security function includes a ciphering function for preventing data monitoring from a third party, and an integrity protection function for preventing third party data manipulation.

A radio resource control (RRC) layer of the third layer is defined only in the control plane. The RRC layer handles logical channels, transport channels and physical channels for the configuration, re-configuration and release of radio bearers (RBs). Here, a radio bearer (RB) denotes a service provided by the second layer for data transfer between the UE and the network. The RRC layers of the UE and the network exchange RRC messages with each other.

The RB may be broadly divided into two bearers, that is, a signaling radio bearer (SRB) used to transmit an RRC message on a control plane and a data radio bearer (DRB) used to transmit user data on a user plane. The DRB may be divided into a UM DRB using UM RLC and AM DRB using AM RLC according to method for operating RLC.

Hereinafter, an RRC state of a UE and an RRC connection method will be described. The RRC state, which indicates whether the RRC layer of the UE is logically connected to the RRC layer of the E-UTRAN, is called an RRC_CONNECTED state if the RRC layers are connected and is called an RRC_IDLE state if the RRC layers are not connected.

Since the E-UTRAN detects presence of a UE in an RRC_CONNECTED state in cell units, it is possible to efficiently control the UE. In contrast, the E-UTRAN cannot detect a UE in an RRC_IDLE state in cell units and a core network (CN) manages the UE in an RRC_IDLE state in units of TA which is greater than a cell. That is, the UE in the RRC_IDLE state transitions to the RRC_CONNECTED state in order to receive a service such as voice or data from a cell.

In particular, when a user first turns a UE on, the UE searches for an appropriate cell and then camps on an RRC_IDLE state in the cell. The UE in the RRC_IDLE state performs an RRC connection establishment process with the RRC layer of the E-UTRAN to transition to the RRC_CONNECTED state when RRC connection needs to be established. The RRC connection needs to be established when uplink data transmission is necessary due to call connection attempt of a user, when a response message is transmitted in response to a paging message received from the E-UTRAN, etc.

A non-access stratum (NAS) layer located above the RRC layer performs a function such as session management and mobility management. In the NAS layer, two states such as an EPS mobility management-REGISTERED (EMM-REGISTERED) state and an EMM-UNREGISTERED state are defined in order to manage mobility of a UE. These two states are applied to the UE and the MME. A UE is first in the EMM-UNREGISTERED state and performs a process of registering with a network through an initial attach procedure in order to access the network. If the attach procedure is successfully performed, the UE and the MME enter the EMM-REGISTERED STATE.

In the NAS layer, in order to manage signaling connection between the UE and the EPC, an EPS connection management (ECM)-IDLE state and an ECM_CONNECTED state are defined and applied to the UE and the MME. If a UE in the ECM-IDLE state is RRC connected to the E-UTRAN, the UE enters the ECM-CONNECTED state. If the MME in the ECM-IDLE state is S1 connected to the E-UTRAN, the MME enters the ECM-CONNECTED state.

When the UE is in the ECM-IDLE state, the E-UTRAN does not have context information of the UE. Accordingly, the UE in the ECM-IDLE state performs a UE-based mobility associated procedure, such as cell selection or reselection, without receiving a command of the network. In contrast, if the UE is in the ECM-CONNECTED state, mobility of the UE is managed by the command of the network. If the location of the UE is changed in the ECM-IDLE state, the UE informs the network of the location thereof via a tracking area (TA) update procedure.

In an LTE system, one cell configuring an eNB is configured to use a bandwidth such as 1.25, 2.5, 5, 10, 15 or 20 MHz to provide a downlink or uplink transmission service to several UEs. Different cells may be configured to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH).

Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

FIG. 4 is a diagram showing physical channels used in a 3GPP system and a general signal transmission method using the same.

A UE performs an initial cell search operation such as synchronization with an eNB when power is turned on or the UE enters a new cell (S401). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which has completed the initial cell search may receive a Physical Downlink Control Channel (PDCCH) and a Physical Downlink Shared Channel (PDSCH) according to information included in the PDCCH so as to acquire more detailed system information (S402).

Meanwhile, if the eNB is initially accessed or radio resources for signal transmission are not present, the UE may perform a Random Access Procedure (RACH) (step S403 to S406) with respect to the eNB. In this case, the UE may transmit a specific sequence through a Physical Random Access Channel (PRACH) as a preamble (S403), and receive a response message to the preamble through the PDCCH and the PDSCH corresponding thereto (S404). In case of contention based RACH, a contention resolution procedure may be further performed.

The UE which has performed the above procedures may perform PDCCH/PDSCH reception (S407) and Physical Uplink Shared Channel PUSCH)/Physical Uplink Control Channel (PUCCH) transmission (S408) as a general uplink/downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In case of the 3GPP LTE system, the UE may transmit the control information such as CQI/PMI/RI through the PUSCH and/or the PUCCH.

FIG. 5 is a diagram showing the structure of a radio frame used in a Long Term Evolution (LTE) system.

Referring to FIG. 5, the radio frame has a length of 10 ms (327200×$T_s$) and includes 10 subframes with the same size. Each subframe has a length of 1 ms and includes two slots. Each slot has a length of 0.5 ms (15360×$T_s$). $T_s$ denotes a sampling time, and is represented by $T_s=1/(15\text{kHz}\times2048)$ =3.2552×$10^{-8}$ (about 33 ns). Each slot includes a plurality of OFDM symbols in a time domain, and includes a plurality of resource blocks (RBs) in a frequency domain. In the LTE system, one RB includes 12 sub-carriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of EUTRAN coverage (subject to regional regulation and operator policy, and limited to specific public-safety designated frequency bands and terminals)

FIG. 6 is an example of default data path for communication between two UEs. With reference to FIG. 6, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

FIGS. 7 and 8 are examples of data path scenarios for a proximity communication. If wireless devices (e.g., UE1, UE2) are in proximity of each other, they may be able to use a direct mode data path (FIG. 7) or a locally routed data path (FIG. 8). In the direct mode data path, wireless devices are connected directly each other (after appropriate procedure(s), such as authentication), without eNB and SGW/PGW. In the locally routed data path, wireless devices are connected each other through eNB only.

FIG. 9 is a conceptual diagram illustrating for a non-roaming reference architecture.

PC1 to PC 5 represent interfaces. PC1 is a reference point between a ProSe application in a UE and a ProSe App server. It is used to define application level signaling requirements. PC 2 is a reference point between the ProSe App Server and the ProSe Function. It is used to define the interaction between ProSe App Server and ProSe functionality provided by the 3GPP EPS via ProSe Function. One example may be for application data updates for a ProSe database in the ProSe Function. Another example may be data for use by ProSe App Server in interworking between 3GPP functionality and application data, e.g. name translation. PC3 is a reference point between the UE and ProSe Function. It is used to define the interaction between UE and ProSe Function. An example may be to use for configuration for ProSe discovery and communication. PC4 is a reference point between the EPC and ProSe Function. It is used to define the interaction between EPC and ProSe Function. Possible use cases may be when setting up a one-to-one communication path between UEs or when validating ProSe services (authorization) for session management or mobility management in real time.

PC5 is a reference point between UE to UE used for control and user plane for discovery and communication, for relay and one-to-one communication (between UEs directly and between UEs over LTE-Uu). Lastly, PC6 is a reference point may be used for functions such as ProSe Discovery between users subscribed to different PLMNs.

EPC (Evolved Packet Core) includes entities such as MME, S-GW, P-GW, PCRF, HSS etc. The EPC here represents the E-UTRAN Core Network architecture. Interfaces inside the EPC may also be impacted albeit they are not explicitly shown in FIG. 9.

Application servers, which are users of the ProSe capability for building the application functionality, e.g. in the Public Safety cases they can be specific agencies (PSAP) or in the commercial cases social media. These applications are defined outside the 3GPP architecture but there may be reference points towards 3GPP entities. The Application server can communicate towards an application in the UE.

Applications in the UE use the ProSe capability for building the application functionality. Example may be for communication between members of Public Safety groups or for social media application that requests to find buddies in proximity. The ProSe Function in the network (as part of EPS) defined by 3GPP has a reference point towards the ProSe App Server, towards the EPC and the UE.

The functionality may include but not restricted to e.g.:
Interworking via a reference point towards the 3rd party Applications
Authorization and configuration of the UE for discovery and Direct communication
Enable the functionality of the EPC level ProSe discovery
ProSe related new subscriber data and/handling of data storage; also handling of ProSe identities;
Security related functionality
Provide Control towards the EPC for policy related functionality
Provide functionality for charging (via or outside of EPC, e.g. offline charging) Especially, the following identities are used for ProSe Direct Communication:
Source Layer-2 ID identifies a sender of a D2D packet at PC5 interface. The Source Layer-2 ID is used for identification of the receiver RLC UM entity;
Destination Layer-2 ID identifies a target of the D2D packet at PC5 interface. The Destination Layer-2 ID is used for filtering of packets at the MAC layer. The Destination Layer-2 ID may be a broadcast, groupcast or unicast identifier; and
SA L1 ID identifier in Scheduling Assignment (SA) at PC5 interface. SA L1 ID is used for filtering of packets at the physical layer. The SA L1 ID may be a broadcast, groupcast or unicast identifier.

No Access Stratum signaling is required for group formation and to configure Source Layer-2 ID and Destination Layer-2 ID in the UE. This information is provided by higher layers.

In case of groupcast and unicast, the MAC layer will convert the higher layer ProSe ID (i.e. ProSe Layer-2 Group ID and ProSe UE ID) identifying the target (Group, UE) into two bit strings of which one can be forwarded to the physical layer and used as SA L1 ID whereas the other is used as Destination Layer-2 ID. For broadcast, L2 indicates to L1 that it is a broadcast transmission using a pre-defined SA L1 ID in the same format as for group- and unicast.

FIG. 10 is a conceptual diagram illustrating for a Layer 2 structure for Sidelink.

The Sidelink is UE to UE interface for ProSe direct communication and ProSe Direct Discovery. Corresponds to the PC5 interface. The Sidelink comprises ProSe Direct Discovery and ProSe Direct Communication between UEs. The Sidelink uses uplink resources and physical channel structure similar to uplink transmissions. However, some changes, noted below, are made to the physical channels. E-UTRA defines two MAC entities; one in the UE and one in the E-UTRAN. These MAC entities handle the following transport channels additionally, i) sidelink broadcast channel (SL-BCH), ii) sidelink discovery channel (SL-DCH) and iii) sidelink shared channel (SL-SCH).

Basic transmission scheme: the Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

Physical-layer processing: the Sidelink physical layer processing of transport channels differs from UL transmission in the following steps:
  i) Scrambling: for PSDCH and PSCCH, the scrambling is not UE-specific;
  ii) Modulation: 64 QAM is not supported for Sidelink Physical Sidelink control channel: PSCCH is mapped to the Sidelink control resources. PSCCH indicates resource and other transmission parameters used by a UE for PSSCH.

Sidelink reference signals: for PSDCH, PSCCH and PSSCH demodulation, reference signals similar to uplink demodulation reference signals are transmitted in the 4th symbol of the slot in normal CP and in the 3rd symbol of the slot in extended cyclic prefix. The Sidelink demodulation reference signals sequence length equals the size (number of sub-carriers) of the assigned resource. For PSDCH and PSCCH, reference signals are created based on a fixed base sequence, cyclic shift and orthogonal cover code.

Physical channel procedure: for in-coverage operation, the power spectral density of the sidelink transmissions can be influenced by the eNB.

FIG. 11 is a conceptual diagram illustrating for protocol stack for ProSe Direct Communication.

FIG. 11(a) shows the protocol stack for the user plane, where PDCP, RLC and MAC sublayers (terminate at the other UE) perform the functions listed for the user plane (e.g. header compression, HARQ retransmissions). The PC5 interface consists of PDCP, RLC, MAC and PHY as shown in FIG. 11a.

User plane details of ProSe Direct Communication: i) MAC sub header contains LCIDs (to differentiate multiple logical channels), ii) The MAC header comprises a Source Layer-2 ID and a Destination Layer-2 ID, iii) At MAC Multiplexing/demultiplexing, priority handling and padding are useful for ProSe Direct communication, iv) RLC UM is used for ProSe Direct communication, v) Segmentation and reassembly of RLC SDUs are performed, vi) A receiving UE needs to maintain at least one RLC UM entity per transmitting peer UE, vii) An RLC UM receiver entity does not need to be configured prior to reception of the first RLC UM data unit, and viii) U-Mode is used for header compression in PDCP for ProSe Direct Communication.

FIG. 11(b) shows the protocol stack for the control plane, where RRC, RLC, MAC, and PHY sublayers (terminate at the other UE) perform the functions listed for the control plane. A D2D UE does not establish and maintain a logical connection to receiving D2D UEs prior to a D2D communication.

FIG. 12 is a conceptual diagram illustrating for a PC5 interface for ProSe Direct Discovery.

ProSe Direct Discovery is defined as the procedure used by the ProSe-enabled UE to discover other ProSe-enabled UE(s) in its proximity using E-UTRA direct radio signals via PC5.

Radio Protocol Stack (AS) for ProSe Direct Discovery is shown in FIG. 12.

The AS layer performs the following functions:

Interfaces with upper layer (ProSe Protocol): The MAC layer receives the discovery information from the upper layer (ProSe Protocol). The IP layer is not used for transmitting the discovery information.

Scheduling: The MAC layer determines the radio resource to be used for announcing the discovery information received from upper layer.

Discovery PDU generation: The MAC layer builds the MAC PDU carrying the discovery information and sends the MAC PDU to the physical layer for transmission in the determined radio resource. No MAC header is added.

There are two types of resource allocation for discovery information announcement.

Type 1: A resource allocation procedure where resources for announcing of discovery information are allocated on a non UE specific basis, further characterized by: i) The eNB provides the UE(s) with the resource pool configuration used for announcing of discovery information. The configuration may be signalled in SIB, ii) The UE autonomously selects radio resource(s) from the indicated resource pool and announce discovery information, iii) The UE can announce discovery information on a randomly selected discovery resource during each discovery period.

Type 2: A resource allocation procedure where resources for announcing of discovery information are allocated on a per UE specific basis, further characterized by: i) The UE in RRC_CONNECTED may request resource(s) for announcing of discovery information from the eNB via RRC, ii) The eNB assigns resource(s) via RRC, iii) The resources are allocated within the resource pool that is configured in UEs for monitoring.

For UEs in RRC_IDLE, the eNB may select one of the following options:

The eNB may provide a Type 1 resource pool for discovery information announcement in SIB. UEs that are authorized for Prose Direct Discovery use these resources for announcing discovery information in RRC_IDLE.

The eNB may indicate in SIB that it supports D2D but does not provide resources for discovery information announcement. UEs need to enter RRC Connected in order to request D2D resources for discovery information announcement.

For UEs in RRC_CONNECTED,

A UE authorized to perform ProSe Direct Discovery announcement indicates to the eNB that it wants to perform D2D discovery announcement.

The eNB validates whether the UE is authorized for ProSe Direct Discovery announcement using the UE context received from MME.

The eNB may configure the UE to use a Type 1 resource pool or dedicated Type 2 resources for discovery information announcement via dedicated RRC signaling (or no resource).

The resources allocated by the eNB are valid until a) the eNB de-configures the resource(s) by RRC signaling or b) the UE enters IDLE. (FFS whether resources may remain valid even in IDLE).

Receiving UEs in RRC_IDLE and RRC_CONNECTED monitor both Type 1 and Type 2 discovery resource pools as authorized. The eNB provides the resource pool configuration used for discovery information monitoring in SIB. The SIB may contain discovery resources used for announcing in neighbor cells as well.

Synchronous and asynchronous deployments are supported. Discovery resources can be overlapping or non-overlapping across cells.

A UE if authorized by the NW can announce discovery message only on serving cell. The UE can monitor discovery resources in the same as well as other frequencies than the serving cell, in same or different PLMNs.

The serving cell may provide in SIB 19 a list of frequencies along with PLMN ID on which the UE may aim to monitor discovery message.

The serving cell does not provide detailed ProSe Discovery configuration for other carrier frequencies. The UE shall read SIB19 and other relevant SIBs on other carriers if it wants to perform discovery message monitoring on those carriers.

Obtaining ProSe Direct Discovery configuration by reading SIB19 (and other SIBs) of an inter-frequency and/or inter-PLMN cell shall not affect the UE's Uu reception on the serving cell(s).

The UE performs intra-frequency ProSe Direct Discovery announcement in subframes in which a ProSe Direct Discovery resource pool is configured and the UE is not expected to perform uplink Uu transmission. The UE shall not create autonomous gaps.

Intra-frequency, inter-frequency and inter-PLMN ProSe Direct Discovery monitoring shall not affect Uu reception. The UE uses DRX occasions in RRC_IDLE and RRC_CONNECTED or second RX chain if it is available, for intra-frequency, inter-frequency and inter-PLMN discovery message monitoring. The UE shall not create autonomous gaps.

An RRC_CONNECTED UE sends a ProSe UE Information indication to the serving cell if it is interested or no longer interested in intra-frequency, inter-frequency or inter-PLMN discovery message monitoring.

According to a recently agreed 3GPP standard, Both Model A and Model B discovery are supported. Relay Discovery Model A uses a single discovery protocol message (Announcement). And, Relay Discovery Model B uses two discovery protocol messages (Solicitation and Response).

FIG. 13 is a diagram illustrating the procedure for Relay Discovery Model A.

Referring to FIG. 13, UE-1 announces a discovery message, and UE-2~UE-5 monitor the discovery message. Here, UE-1 may be a relay UE, and UE-2~UE-5 may be potential remote UEs.

The following parameters are used in the message for Relay Discovery Model A:

ProSe Relay UE ID: link layer identifier that is used for direct communication and is associated with a Relay Service Code.

Announcer info: provides information about the announcing user.

Radio Layer Information: contains information about the radio layer information, e.g. radio conditions between the eNB and the UE-to-Network Relay, to assist the Remote UE selecting the proper UE-to-Network Relay.

FIG. 14 is a diagram illustrating the procedure for Relay Discovery Model B.

Referring to FIG. 14, UE-1 (discoverer) transmits a discovery solicitation message for discovering a relay UE to UE-2~UE-5 (discoveree). In FIG. 14, UE-2 and UE-3 transmit discovery response message to UE-1 in response to the discovery solicitation message. Here, UE-1 may be a remote UE, and UE-2~UE-5 may be potential relay UEs.

The following parameters are used in the discovery solicitation message:

Discoverer info: provides information about the discoverer user.

Relay Service Code: information about connectivity that the discoverer UE is interested in. The Relay Service Codes are configured in the Prose Remote UEs interested in related connectivity services.

The following parameters are used in the discovery response message:

ProSe Relay UE ID: link layer identifier that is used for direct communication and is associated with a Relay Service Code.

Discoveree info: provides information about the discoveree.

Radio Layer Information: contains information about the radio layer information, e.g. radio conditions between the eNB and the UE-to-Network Relay, to assist the Remote UE selecting the proper UE-to-Network Relay.

Meanwhile, the serving cell of a relay and a remote UE might be different. Depending on whether the network supports the resource coordination between the serving cell of the relay and the serving of the remote UE, it would be beneficial to limit the relay selection to the relay belonging to the same cell of the cell of the remote UE.

Currently, discovery and communication between the relay UE and the remote UE is possible even in a scenario where two UEs are staying in different cells. FIG. 15 is a conceptual diagram illustrating a case that two UEs are staying in different cells.

Referring to FIG. 15, under the scenario of cell for ProSe of L2 relay is different from cell for ProSe of the remote UE is different, it may not be possible to perform direct discovery and direct communication since the L2 configuration and resource are configured by Cell 2 while remote UE transmits the message with the synchronization of Cell 1.

Therefore, for solving the above-mentioned problem, the present invention suggests the method for remote UE selecting relay UE among the candidate relay UE.

<First Embodiment>

In the first embodiment of the present invention, it is discussed about the method of selecting a relay UE operating (expected to operate) on the same cell with a remote UE by the remote UE.

1) Firstly, it can be considered the autonomous initial relay UE selection by the remote UE (for the case of that there are no connected relay UE with a remote UE).

The relay UE broadcasts announcement message including the cell identity information via a discovery message. If there is no discovery announcement message from relay UEs, the remote UE also sends solicitation message for relay discovery periodically.

In case of that nearby relay UEs receive the solicitation message from the remote UE, the relay UEs send response messages including cell identity. If there is a connected relay UE and if the cell identity of the connected remote UE is different from the one of the relay UE, the remote UE sends the message to release the established connection.

After receiving the announcement message or the response message for the solicitation message, the remote UE chooses the relay UE whose cell identity is same as the cell identity of the remote UE. The remote UE excludes the candidate relay UE whose cell identity is different from the cell identity of the remote UE, from the list of candidate relay UE.

2) Next, it is considered the autonomous relay UE reselection by the remote UE for the case of that there is the connected relay UE and the cell identity of the relay UE changes.

In this case, the relay UE broadcasts announcement message including the cell identity information for other potential remote UE, periodically or upon change of the cell identity of the relay UE. Upon the change of the cell identity of the relay UE (e.g., due to handover), the relay UE provides the cell identity of the relay UE to the connected remote UEs via PC5 signaling protocol.

If there is the connected relay UE and the cell identity of the currently connected relay UE is different from that of the remote UE, the remote UE sends the message for releasing the established connection or the remote UE triggers a relay UE reselection procedure involving a relay discovery procedure (e.g., transmitting the discovery announcement message or monitoring the discovery message).

During the selection of another relay UE, the remote UE chooses the relay UE whose cell identity is same as the cell identity of the remote UE. The remote UE excludes the candidate relay UE whose cell identity is different from the cell identity of the remote UE, from the list of candidate relay UE 3) Next, it is also considered the autonomous relay UE reselection by the remote UE for the case of that there is the connected relay UE and the cell identity of the remote UE changes.

Upon change of the cell identity of the remote UE (e.g., due to handover), the remote UE provides the cell identity of the remote UE to the relay UE via PC5 signaling protocol. Further, the relay UE sends the response message including cell identity information.

If there is the connected relay UE and if the cell identity of the remote UE is different from that of the connected relay UE, the remote UE sends the message to release the established connection or the remote UE triggers the relay reselection procedure involving the relay discovery procedure (e.g., transmitting discovery announcement message or monitoring discovery message). During the selection of another relay UE, the remote UE chooses the relay UE whose cell identity is same as the cell identity of the remote UE. The remote UE excludes the candidate relay UE whose cell identity is different from the cell identity of the remote UE, from the list of candidate relay UE 4) Furthermore, it is necessary to discuss about autonomous connection release by relay UE for the case there is the connected relay UE and the cell identity of the remote UE changes.

Upon change of the cell identity of the remote UE (e.g., due to handover), the remote UE provides the cell identity of the UE to the relay UE via PC5 signaling protocol. If there is an established connection between the relay UE and the remote UE and if the cell identity of the remote UE is different from that of the connected relay UE, the relay UE sends the message to release the established connection.

5) Finally, the autonomous relay (re)selection can be performed based on the network provided cell list. Specifically, the network provides the cell list information between which the discovery/communication of the relay UE and the remote UE is allowed via the broadcast/dedicated signaling.

In case the network provides the cell list of inter-cell operation is allowed, the relay/remote UE triggers provision of the cell identity information to the connected remote/relay UE respectively in the procedures 1)-3) upon the (changed) cell identity is not included in network provided cell list. Then subsequent procedure is performed in the above-mentioned procedures 1)-3).

During the selection of another relay UE, the remote UE chooses the relay UE whose cell identity is included in the network provided cell list. The remote UE excludes the candidate relay UE whose cell identity is not included in the network provided cell list.

<Second Embodiment>

The second embodiment of the present invention is related to the provision of operating relay UE information in the cell.

A) In order to acquire the operating information on the relay UE, the relay UE provides the information on the relay UE to current serving cell in the following cases.
  one of the information on the relay UE changes,
  the relay UE establishes RRC connection,
  the relay UE changes its serving cell/cell for ProSe or MBMS.
The information on the relay UE includes:
The identity of the relay UE (e.g., ProSe Relay UE ID)
the frequency information of the relay UE.
the cell identity information of the relay UE where ProSe/MBMS for the relay UE operates (is expected to operate)
the service type information which the relay UE supports (e.g., relay service code).

B) The cell provides the up-to-date information on the relay UE which operates (is camped or connected) in the current cell (or operates in another cell) to the remote UE via dedicated/broadcast signaling The elements of provided information on the relay UE is same as the above information on the relay UE.

In case broadcast signaling is used, if the system information change notification is received via paging message and the up-to-date system information including information on the relay UE is not received, the remote UE establishes RRC connection (if the remote UE stays in RRC idle mode) and informs the selected information on the relay UE to the current serving cell. The selected information on the relay UE is same as the information on the relay UE described above.

Then, the network provides the permission message whether the selected relay is allowed or not to the remote UE.

If the remote UE receives up-to-date system information including information on the relay UE, the UE does not inform the selected information on the relay UE to the current serving cell anymore and performs autonomous relay selection procedure described in section C) below. If the relay UE performs handover, the source eNB forwards the relay UE information associated with the relay UE to the target eNB.

C) The remote UE chooses the relay UE among the relay UEs whose cell identity for ProSe/MBMS of the relay UE is same as the cell identity for ProSe/MBMS of the remote UE. The remote UE excludes from the list of candidate relay UE the candidate relay UE whose cell identity for ProSe/MBMS is different from the cell identity for ProSe/MBMS of the remote UE.

<Third Embodiment>

In the third embodiment of the present invention, it is suggested the method of allowing the remote UE to select a relay UE operating (expected to operate) on the same/ different cell with remote UE. Especially, the third embodiment is described in perspective of each of the Remote UE and the Relay UE.

1. Remote UE Perspective

Step 1) The remote UE acquires the cell identity information of the relay UE by the discovery message including cell identity information.

Step 2) Optionally, the remote UE selects one relay UE for the UE itself among the found relays.

Step 3) The remote UE establishes a RRC connection and sends the assistance information to its serving cell for assisting the eNB to coordinate with the cell of the relay UE in one or more following cases:
  if there is no connected relay UE and the remote UE finds the nearby relay UE
  if there is no connected relay UE and the remote UE finds the nearby relay UE whose cell identity are different from the one of remote UE
  if there is connected relay UE and the cell information of the relay UE and/or remote UE changes.
  if there is connected relay UE and the cell information of the relay UE is different from cell information of the remote UE.
  if there is no connected relay UE and the remote UE finds the nearby relay UE whose cell identity is not included in the network provided cell list.
  if there is connected relay UE and the cell information of the relay UE is not included in the network provided cell list.

As for the network provided cell list, it is assumed that the network provides the ProSe cell list information between which the discovery/communication of the relay UE and remote UE is allowed via broadcast/dedicated signaling.

The assistance information includes at least one of following:
  the cell identity information of the relay UE where ProSe/MBMS for the UE operates (is expected to operate),
  the identity of the relay UE (e.g., ProSe Relay UE ID),
  the service type information which the relay UE supports (e.g., relay service code),
  the cell identity information of the remote UE where ProSe/MBMS for the remote UE operates (is expected to operate),
  the identity of the remote UE, or
  the service type information which the remote UE is interested in. (e.g., relay service code).

Step 4) If the serving cell identity of the remote UE is different from the cell identity for ProSe/MBMS, the serving cell forwards the received assistance information to the cell of the remote UE for the ProSe/MBMS.

Step 5) If the cell for ProSe/MBMS of the remote UE is different from the cell for ProSe/MBMS of the relay UE, the cell for ProSe/MBMS of the remote UE request to the cell for ProSe/MBMS of the relay UE for allowing to be served by the relay UE. The request includes all or subset of the received assistance information.

Step 6) The cell for ProSe/MBMS of the relay UE determines whether to serve the remote UE by the relay UE and informs the cell for ProSe/MBMS of the remote UE of the resource information for a communication via the relay UE. The resource information includes the timing offset, allocated frame/subframe information for the communication via the relay UE.

Step 7) The cell for ProSe/MBMS of the remote UE provides the resource configuration information to the remote UE.

2. Relay UE Perspective

Step 1) The relay UE sends the assistance information to its serving cell for assisting the eNB to coordinate with the cell of the remote UE in one or more following cases:

- if the relay UE receives the connection request from remote UE,
- if there is no connected relay UE and the relay UE receives the connection request from remote UE whose cell identity are different from the one of relay UE,
- if there is connected relay UE and the cell information of the relay UE and/or remote UE changes,
- if there is connected relay UE and the cell information of the relay UE is different from cell information of the remote UE, (in this case, the relay UE could be aware of the cell identity of the remote UE by remote UE informing the changed cell identity to the connected relay UE via PC5 signaling protocol)
- if there is no connected relay UE and the relay UE receives the connection request from remote UE whose cell identity is not included in the network provided cell list, or
- if there is connected relay UE and the cell information of the currently connected relay UE is not included in the network provided cell list.

As for the network provided cell list, it is assumed that the network provides the ProSe cell list information between which the discovery/communication of the relay UE and remote UE is allowed via broadcast/dedicated signaling.

Further, the assistance information includes at least one of following:

- the cell identity information of the relay UE where ProSe/MBMS for the UE operates (is expected to operate),
- the identity of the relay UE (e.g., ProSe Relay UE ID),
- the service type information which the relay UE supports (e.g., relay service code),
- the cell identity information of the remote UE where ProSe/MBMS for the remote UE operates (is expected to operate),
- the identity of the remote UE, or
- the service type information which the remote UE is interested in. (e.g., relay service code).

Step 4) If the serving cell identity of the relay UE is different from the cell identity for ProSe/MBMS, the serving cell forwards the received assistance information to the cell of the relay UE for ProSe/MBMS.

Step 5) If the cell for ProSe/MBMS of the remote UE is different from the cell for ProSe/MBMS of the relay UE, the cell for ProSe/MBMS of the relay UE request to the cell for ProSe/MBMS of the relay UE for allowing to be served by the relay. The request includes all or subset of the received assistance information.

Step 6) The cell for ProSe/MBMS of the remote UE determines whether the remote UE to be connected by the relay UE and informs the cell for ProSe/MBMS of the relay UE of the resource information for the communication via the relay UE. The resource information includes the timing offset and allocated frame/subframe information for the communication via the relay UE.

Step 7) The cell for ProSe/MBMS of the relay UE provides the resource configuration information to the relay UE.

In the above invention, the cell identity information refers to an operating frequency, a PCI (Physical Cell ID) and a ECGI (E-UTAN Cell Global Identifier). Further, the cell of the remote UE and/or relay UE refers to PCell/serving cell, cell on ProSe carrier and/or MBMS (Multimedia Broadcast Multicast Service) carrier.

FIG. 16 is a flow chart illustrating the procedure for communicating via a relay user equipment (UE) by the remote UE in accordance with one embodiment of the present invention. Especially, in FIG. 16, it is assumed that the cell of the relay UE is different from the cell of the remote UE.

Referring to FIG. 16, in S1601, the remote UE, which is connected with a first cell, receives information on an identifier of a second cell connected with the relay UE from the relay UE.

Preferably, the information on the identifier of the second cell is included in a discovery message announced from the relay UE. Or, the information on the identifier of the second cell is transmitted from the relay UE to the remote UE, when the second cell connected with the relay UE is changed or when the first cell connected with the UE is changed. Especially, if the first cell connected with the UE is changed, the remote UE may transmit information on the identifier of the first cell to the relay UE.

In S1603, the remote UE, which receives the information on the identifier of the second cell, may transmits an assistance message including information that an identifier of the first cell is different from the identifier of the second cell to the first cell. Of course, the assistance message is transmitted when the identifier of the first cell is different from the identifier of the second cell. Preferably, the assistance message further includes information on at least one of the identifier of the second cell, an identifier of the relay UE or a relay service code.

Next, in step 1603, the first cell negotiates about relaying via the relay UE. For example, the first cell transmits a relay request message including the assistance message to the second cell and receives the resource information from the second cell in response to the relay request message.

In step 1604, the first cell transmits a resource allocation message including resource information for a communication via the relay UE to the remote UE. Then, in step 1605, the relay procedure via the relay UE is performed based on the resource information.

FIG. 17 is a block diagram illustrating a communication apparatus in accordance with an embodiment of the present invention.

Referring to FIG. 17, a communication device 1700 includes a processor 1710, a memory 1720, a Radio Frequency (RF) module 1730, a display module 1740, and a user interface module 1750.

The communication device 1700 is illustrated for convenience of the description and some modules may be omitted. Moreover, the communication device 1700 may further include necessary modules. Some modules of the communication device 1700 may be further divided into sub-modules. The processor 1710 is configured to perform operations according to the embodiments of the present invention exemplarily described with reference to the figures. Specifically, for the detailed operations of the processor 1710, reference may be made to the contents described with reference to FIGS. 1 to 16.

The memory 1720 is connected to the processor 1710 and stores operating systems, applications, program code, data, and the like. The RF module 1730 is connected to the processor 1710 and performs a function of converting a baseband signal into a radio signal or converting a radio signal into a baseband signal. For this, the RF module 1730 performs analog conversion, amplification, filtering, and frequency upconversion or inverse processes thereof. The display module 1740 is connected to the processor 1710 and displays various types of information. The display module 1740 may include, but is not limited to, a well-known element such as a Liquid Crystal Display (LCD), a Light Emitting Diode (LED), or an Organic Light Emitting Diode (OLED). The user interface module 1750 is connected to the processor 1710 and may include a combination of well-known user interfaces such as a keypad and a touchscreen.

The above-described embodiments are combinations of elements and features of the present invention in a predetermined manner. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims that are not explicitly dependent on each other can be combined to provide an embodiment or new claims can be added through amendment after the application is filed.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well-known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

While the above-described method for discovering a relay user equipment (UE) via a device to device (D2D) link at a user equipment (UE) in a wireless communication system has been described centering on an example applied to the 3GPP LTE system, the present invention is applicable to a variety of wireless communication systems in addition to the 3GPP LTE system.

The invention claimed is:

1. A method for communicating by a user equipment (UE) in a wireless communication system, the method comprising:

obtaining, from a relay UE, information on a first identifier of a first primary cell connected with the relay UE;

transmitting, to a second primary cell connected with the UE, an assistance message comprising information on a first cell identity, a second cell identity and a second identifier of the second primary cell based on the information on the first identifier, wherein the first cell identity and the second cell identity are related to proximity based service (ProSe) cells, included in a cell list obtained from a network, supporting the relay UE and the UE, respectively;

receiving, from a ProSe cell supporting the UE, a resource allocation message comprising resource information based on the information on the first cell identity, the second cell identity and the second identifier; and communicating via the relay UE based on the resource information.

2. The method of claim 1, wherein the information on the first identifier is included in a discovery message announced from the relay UE.

3. The method of claim 1, wherein the information on the first identifier is transmitted from the relay UE in a case that one of the first primary cell or the second primary cell is changed.

4. The method of claim 3, further comprising transmitting information on the second identifier to the relay UE in a case that the second primary cell is changed.

5. The method of claim 1, wherein the first identifier and the second identifier respectively comprise at least one of an operating frequency or a physical cell identifier.

6. The method of claim 1, further comprising;
determining whether the first identifier is different from the second identifier of the second cell or not,
wherein the assistance message is transmitted in a case that the first identifier is different from the second identifier.

7. The method of claim 1, wherein the second identifier is different from the second cell identity, the assistant message is transmitted from the second primary cell to the ProSe cell.

8. The method of claim 1, further comprising:
obtaining, from the network, the cell list comprising a list of ProSe cells allowed for communication between the relay UE and the UE,
wherein transmitting the assistance message comprises:
transmitting, to the second primary cell, the assistance message based on the information on the first identifier and the cell list.

9. The method of claim 1, further comprising:
receiving a plurality of discovery messages from a plurality of candidate relay UEs, respectively; and
selecting, based on the plurality of the discovery messages, the relay UE from the plurality of the candidate relay UEs,
wherein the information on the first identifier is obtained based on an discovery message from the selected relay UE.

10. A user equipment (UE) in a wireless communication system, the UE comprising:
a memory; and
at least one processor coupled with the memory,
wherein the at least one processor is configured to:
obtain, from a relay UE, information on a first identifier of a first primary cell connected with the relay UE;
transmit, to a second primary cell connected with the UE, an assistance message comprising information on a first cell identity, a second cell identity and a second identifier of the second primary cell based on the information on the first identifier, wherein the first cell identity and the second cell identity are related to proximity based service (ProSe) cells, included in a cell list obtained from a network, supporting the relay UE and the UE, respectively;

receive, from a ProSe cell supporting the UE, a resource allocation message comprising resource information based on the information on the first cell identity, the second cell identity and the second identifier; and communicate via the relay UE based on the resource information.

11. The UE of claim 10, wherein the information on the first identifier is included in a discovery message announced from the relay UE.

12. The UE of claim 10, wherein the information on the first identifier is transmitted from the relay UE in a case that one of the first primary cell or the second primary cell is changed.

13. The UE of claim 12, wherein information on the second identifier is transmitted to the relay UE in a case that the second primary cell is changed.

14. The UE of claim 10, wherein the first identifier and the second identifier respectively comprise at least one of an operating frequency and a physical cell identifier.

15. The UE of claim 10, wherein the at least one processor is further configured to determine whether the first identifier is different from the second identifier, and wherein the assistance message is transmitted in a case that the first identifier is different from the second identifier.

* * * * *